Figure 1:
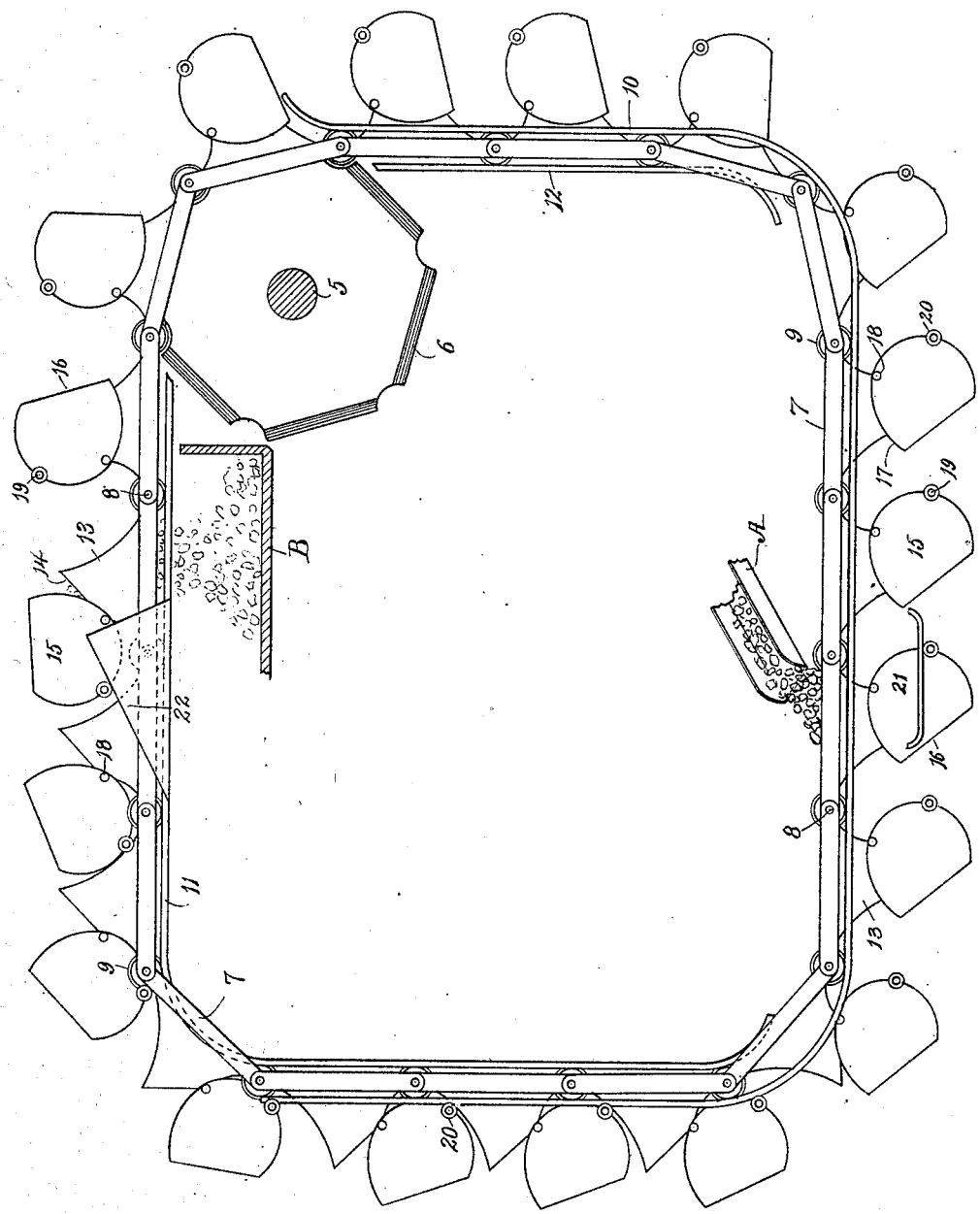

No. 669,571. Patented Mar. 12, 1901.
E. C. BERGHOEFER.
ELEVATOR AND CONVEYER.
(Application filed June 2, 1900.)
(No Model.) 2 Sheets—Sheet 1.

Witnesses. Inventor.
Edward C. Berghoefer
By Hendrick & Morrell
Attorneys.

No. 669,571. Patented Mar. 12, 1901.
E. C. BERGHOEFER.
ELEVATOR AND CONVEYER.
(Application filed June 2, 1900.)
(No Model.)
2 Sheets—Sheet 2.
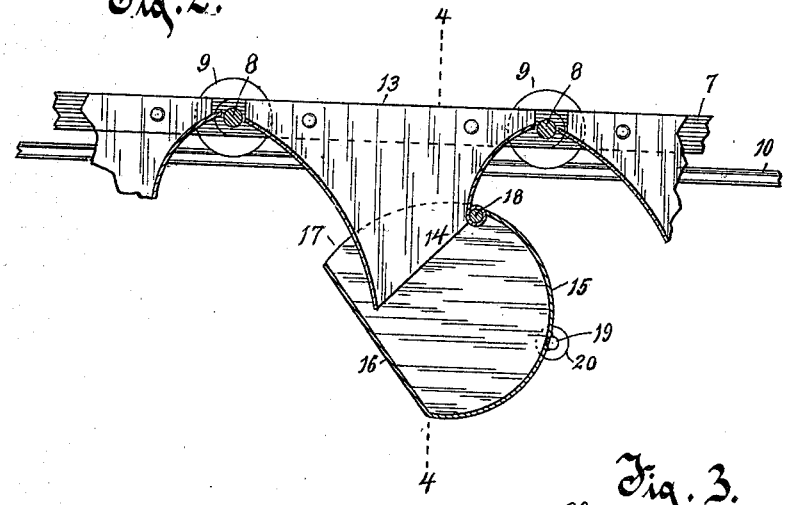
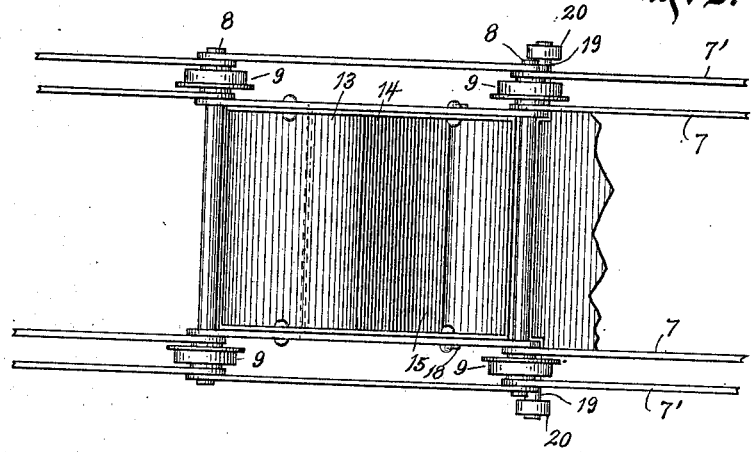
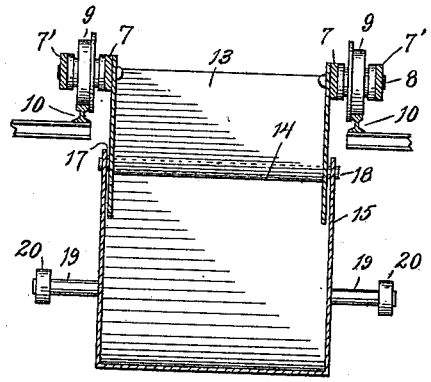
Witnesses.
Inventor.
Edward C. Berghoefer
By Benedict & Morsell
Attorneys.

UNITED STATES PATENT OFFICE.

EDWARD C. BERGHOEFER, OF MILWAUKEE, WISCONSIN.

ELEVATOR AND CONVEYER.

SPECIFICATION forming part of Letters Patent No. 669,571, dated March 12, 1901.

Application filed June 2, 1900. Serial No. 18,804. (No model.)

*To all whom it may concern:*

Be it known that I, EDWARD C. BERGHOEFER, of Milwaukee, in the county of Milwaukee and State of Wisconsin, have invented a new and useful Improvement in Elevators and Conveyers, of which the following is a description, reference being had to the accompanying drawings, which are a part of this specification.

My invention relates to improvements in elevators and conveyers that are adapted for raising coal and transporting it to a distant place and depositing it automatically. The apparatus is also adapted for handling grain, broken stone, or other material in bulk.

The invention consists of the apparatus, its parts, and combinations of parts, as herein described and claimed, or the equivalents thereof.

In the drawings, Figure 1 is a side elevation of the improved elevator and conveyer. Fig. 2 is a longitudinal section of a fragment of the endless conveyer, the section illustrating the conveyer along the lower line thereof, where the bucket depending from the conveyer assumes by gravity the position shown. Fig. 3 is a top plan view of a fragment of the conveyer as it appears on the lower line thereof. Fig. 4 is a transverse section of the conveyer on line 4 4 of Fig. 2.

My improved elevator and conveyer includes an endless flexible chain or carrier on which buckets are pivoted and supported, the endless carrier being supported in part by sprocket-wheels on a driven rotating shaft and also on a track adapted to support it and permit of its travel through a considerable portion of its course.

The general use of the elevator and carrier is indicated in Fig. 1 by means of a chute A, that serves as a convenient means for delivering coal or other material to the elevator and conveyer at a locality in the lower line of its travel and by a platform or receptacle B, onto which the elevator and conveyer is adapted to discharge the coal from the buckets at some point in the upper line of its travel.

In the drawings, 5 is a driven shaft on which are fixed sprocket-wheels 6, adapted to take the carrier thereon and by the rotation of the wheels to cause the carrier to travel along its route. The carrier consists of links 7 7', pivoted together at their extremities by elongated pins or axles 8 through the overlapping ends of the links. The carrier preferably has two sets of links 7 7 and 7' 7' at each side for greater strength and the best mechanical construction. The outer lines of links at each side 7' 7' are not necessarily required, but are desirable. Flanged wheels 9 9, rotatable with or on the axles 8, are so disposed as to travel on the outer tracks 10 and on the inner tracks 11 and 12. Also the wheels 6 on the shaft 5 are constructed with sockets in their peripheries adapted to receive therein the wheels 9 9, which when in contact with the wheels 6 serve as teeth intermeshing with the sprocket-wheels. The wheels 6 are located at an upper corner of the route of the travel of the carrier, and therefrom in the direction of the forward movement of the carrier tracks 10 10 run downwardly and thence curve in a lateral and usually in a substantially horizontal direction along the route of travel of the carrier, and thence curve and extend upwardly along the route of the carrier substantially to the upper horizontal line of travel of the carrier toward the wheels 6 6. Opposite the tracks 10 10 along the downward route of the travel of the carrier are other tracks 12 12, which are disposed parallel to the tracks 10 and at such distance therefrom as to permit of the travel of the wheels 9 between the two lines of the tracks, but preventing much play of the carrier between them. Along the lower route of the travel of the carrier the wheels 9 9 are supported and travel on the tracks 10, being held thereto by gravity, and thence upwardly the inner tracks 11 11 are placed parallel to and opposite the tracks 10 and at such distance therefrom as to permit of the travel upwardly of the wheels 9 9 between the two lines of tracks. Along the upper route of travel of the carrier the wheels 9 9 travel on the inner tracks 11, being held thereto by gravity. In the drawings the route of the carrier is shown as being in a substantially rectangular course; but this is not important, as the carrier may be directed and supported by tracks in oblique directions if occasion preferably requires it.

The lines of links 7 7 are at a distance apart, and to each link is secured a hopper 13, advisably constructed of boiler-plate or analogous metal, that end of which that is in the plane of the links being large and the other or distant end of which being contracted and open, providing a discharging-throat, as shown at 14 in Fig. 2. A bucket 15, preferably of a substantially cylindrical form, with closed ends and preferably with a flat side 16, is provided with an open side or mouth 17, and the bucket along one edge of this mouth 17 is hinged at 18 to one edge of the mouth 14 of the hopper 13. The disposition is such that the bucket thus hinged is suspended on the hopper and by gravity hangs below and so as to receive from the hopper any material passed through it when the carrier is in that part of the course at the bottom of its route, which course is either horizontal or not greatly oblique to a horizontal direction.

Fixed to and projecting from the ends of the bucket there are stud-pins 19 19, advisably provided with antifriction-rollers 20. At the locality of loading the buckets, which in the drawings is illustrated by the chute A, short tracks 21 are provided, being so disposed with reference to the tracks 10 that the rollers 20, mounted on the buckets 15, are adapted to bear against these tracks and hold the bucket steadily in position while receiving its load, especially against being swayed or tilted by the momentum of the coal falling into it and against the side thereof. It will be observed that the front and rear edges of the hoppers 13, Figs. 2 and 3, come close up to the axles 8, so that there is no chance for coal being discharged continuously from a chute A to fall between the hoppers and be thereby lost, as would occur if any considerable opening existed between the edges of the hoppers during the continuous discharge of coal from a chute while the carrier was traveling continuously ahead. When the buckets severally have been thus loaded, they travel with the carrier toward the left in Fig. 1 and upwardly along the route of the carrier, and during this upward travel of the carrier the rollers 20 bear against the track 10 on the exterior tread thereof and support the buckets in upright position. When a bucket has passed beyond the upper extremity of the track 10 in the construction shown in Fig. 1, the stud-pins 19 drop onto links of the carrier, and thus support the bucket in upright position until the bucket reaches the upper line of travel, when it is supported by the adjacent hopper, as will be seen by reference to Fig. 1. If found more convenient or desirable, the track 10 can be continued upwardly around the corner of the route to the upper line of travel. At the desired point of discharge of the buckets inclines 22 are provided which are adapted to receive thereon the rollers 20, and as the carrier travels ahead the buckets are lifted by the inclines and so tilted as to discharge their contents severally through its hopper onto the platform B or such receptacle as is provided therefor. In the drawings I have shown no means for supporting the tracks, the shaft, the incline, or the chute, and it will be understood that such framing, posts, or other devices as are desirable should be employed therefor.

What I claim as my invention is—

1. In combination, an endless carrier, hoppers fixed on and traveling with the carrier, the hoppers having ends open in a direction substantially at a right angle to the plane of the carrier, and buckets hinged to the hoppers so as to be adapted to receive material therefrom.

2. In combination, an endless carrier, hoppers fixed on and traveling with the carrier, the hoppers having ends open in a direction substantially at a right angle to the plane of the carrier, buckets hinged to the hoppers so as when below them the buckets are adapted to receive material from the hoppers, and means for tilting the buckets at a locality in the travel of the carrier where the buckets are above the hoppers.

3. In combination, an endless carrier, hoppers secured to the carrier each hopper having a large open end in the plane of the carrier and an open throat distant from the carrier, buckets hinged to the hoppers at the edge of the discharging-throats the buckets being so disposed that when the carrier is traveling in a substantially horizontal direction with the buckets below the hoppers material poured into such hoppers will by gravity pass through the hoppers into the buckets, and when the carrier is traveling in a horizontal direction with the buckets above the hoppers the buckets will discharge their contents into and through the hoppers in a reverse direction to that in which it passed to enter the buckets.

4. In combination, an endless carrier, hoppers fixed on the carrier, elongated buckets of substantially cylindrical form and open at one side each hinged at the edge of its mouth to the edge of the open throat of a hopper and so arranged that in a portion of the travel of the carrier the bucket hangs by gravity at and about the open discharging-throat of the hopper.

5. The combination, with an endless carrier comprising links pivoted together at their extremities, transverse axles serving as pivots for the links and wheels mounted on the axles, of means for moving the carrier, tracks on which the wheels of the carrier travel in its lower and in its upper lateral courses, hoppers fixed on the carrier, and buckets hinged on the hoppers.

6. The combination with an endless carrier comprising links pivoted together at their extremities, transverse axles serving as pivots for the links and wheels mounted on the axles, of means for moving the carrier, tracks on which the wheels of the carrier travel in its lower and in its upper lateral courses, hoppers fixed on the carrier, buckets hinged on the hoppers, stud-pins projecting from the ends of the buckets, and tracks against which the stud-pins bear and hold the buckets upright during the upward movement of the buckets on the carrier.

7. The combination with an endless carrier comprising links pivoted together at their extremities, transverse axles serving as pivots for the links and wheels mounted on the axles, of means for moving the carrier, tracks on which the wheels of the carrier travel in its lower and in its upper lateral courses, hoppers fixed on the carrier, buckets hinged on the hoppers, stud-pins projecting from the ends of the buckets, and inclines serving as ways on which said stud-pins travel and which by their inclination to the path of the carrier tilt the buckets causing them to discharge their contents into and through the hoppers.

8. In combination, a rotatable sprocket-wheel, an endless flexible carrier running on and driven by the sprocket-wheel, outer and inner tracks along portions of the course of the carrier, wheels mounted in the carrier adapted as teeth to engage the sprocket-wheel and to travel on said tracks, hoppers fixed on the carrier, buckets suspended on the hoppers adapted to receive their loads from the hoppers, and means for tilting the buckets and discharging their loads.

In testimony whereof I affix my signature in presence of two witnesses.

EDWARD C. BERGHOEFER.

Witnesses:
C. T. BENEDICT,
ANNA V. FAUST.